United States Patent
Tarkkala et al.

(10) Patent No.: US 8,132,005 B2
(45) Date of Patent: Mar. 6, 2012

(54) ESTABLISHMENT OF A TRUSTED RELATIONSHIP BETWEEN UNKNOWN COMMUNICATION PARTIES

(75) Inventors: Lauri Tarkkala, Espoo (FI); Nadarajah Asokan, Espoo (FI)

(73) Assignee: Nokia Corporation, Espoo (FI)

( * ) Notice: Subject to any disclaimer, the term of this patent is extended or adjusted under 35 U.S.C. 154(b) by 1357 days.

(21) Appl. No.: 11/237,881

(22) Filed: Sep. 29, 2005

(65) Prior Publication Data

US 2007/0011453 A1    Jan. 11, 2007

(30) Foreign Application Priority Data

Jul. 7, 2005 (EP) .................................... 05014787

(51) Int. Cl.
*H04L 29/06* (2006.01)

(52) U.S. Cl. .................. 713/168; 726/1; 726/2; 726/3; 726/14; 726/17; 709/227; 709/228; 709/230

(58) Field of Classification Search .................. 380/30, 380/44, 37, 282, 283, 284, 285; 713/161, 713/162, 169, 170, 171, 176, 168; 726/3, 726/4, 5, 8, 14, 17, 18, 21; 705/64, 65, 66, 705/67, 71, 74
See application file for complete search history.

(56) References Cited

U.S. PATENT DOCUMENTS

| | | | | | |
|---|---|---|---|---|---|
| 5,299,263 | A | * | 3/1994 | Beller et al. | 380/30 |
| 5,315,658 | A | * | 5/1994 | Micali | 380/286 |
| 5,442,342 | A | * | 8/1995 | Kung | 340/5.27 |
| 5,724,425 | A | * | 3/1998 | Chang et al. | 705/52 |
| 6,073,237 | A | * | 6/2000 | Ellison | 713/171 |
| 6,088,450 | A | * | 7/2000 | Davis et al. | 713/182 |
| 6,226,383 | B1 | * | 5/2001 | Jablon | 380/30 |
| 6,430,690 | B1 | * | 8/2002 | Vanstone et al. | 713/182 |
| 6,886,102 | B1 | * | 4/2005 | Lyle | 726/23 |
| 6,944,663 | B2 | * | 9/2005 | Schuba et al. | 709/225 |
| 7,149,801 | B2 | * | 12/2006 | Burrows et al. | 709/225 |
| 7,197,639 | B1 | * | 3/2007 | Juels et al. | 713/168 |
| 7,356,696 | B1 | * | 4/2008 | Jakobsson et al. | 713/168 |
| 7,600,255 | B1 | * | 10/2009 | Baugher | 726/22 |
| 2003/0172278 | A1 | * | 9/2003 | Farnham et al. | 713/176 |
| 2004/0003283 | A1 | * | 1/2004 | Goodman et al. | 713/201 |
| 2004/0034773 | A1 | * | 2/2004 | Balabine et al. | 713/168 |
| 2004/0268121 | A1 | * | 12/2004 | Shelest et al. | 713/156 |
| 2005/0080858 | A1 | * | 4/2005 | Pessach | 709/206 |

OTHER PUBLICATIONS

Boaz Barak, How to Play ANY Mental Game Over the Net, Apr. 10, 2005, Institute for Advanced Study, www.math.ias.edu/~boaz/Papers/conc-comp.pdf, pp. 1-50.*

Aumann et al., "Everlasting Security in the Bounded Storage Model", Jun. 2002, IEEE Transactions on Information Theory, vol. 48, No. 6, pp. 1668-1680.*

(Continued)

*Primary Examiner* — Taghi Arani
*Assistant Examiner* — Kenneth Chang
(74) *Attorney, Agent, or Firm* — Harrington & Smith

(57) ABSTRACT

The present invention provides an establishment of a trusted relationship between two mutually unknown communication parties in a communication system without the use of a trusted third party. The invention is based on non-interactive proofs-of-work being purpose-bound for establishing the trusted relationship and cryptographically signing information to be transferred between the communication parties using such proofs-of-work for the solving of a problem instance along with verifying the proofs-of-work and generating a session object for a trusted relationship, when the verifying yields an affirmative result.

22 Claims, 3 Drawing Sheets

OTHER PUBLICATIONS

Silaghi, "Meeting Scheduling Guaranteeing n/2-Privacy and Resistant to Statistical Analysis", Sep. 2004, Web Intelligence 2004, pp. 711-715.*

Back, Adam "*Hashcash—A Denial of Service Counter-Measure*", XP-002320374, Aug. 1, 2002, pp. 1-10.

Dwork, Cynthia "*On Memory-Bound Functions for Fighting Spam*", XP-002332184, Aug. 15, 2003, pp. 1-27.

Rackoff, Charles "*Non-Interactive Zero-Knowledge Proof of Knowledge and Chosen Ciphertext Attack*", Apr. 16, 1992, pp. 433-444.

Douceur, John, "*The Sybil Attack*", Proceedings of 1st Workshop on Peer-to-Peer-Systems, Mar. 2002, pp. 1-6.

Dwork, Cynthia et al., "*Pricing via Processing or Combatting Junk Mail*", Lecture Notes in Computer Science, 1993, pp. 1-11.

Juels, Ari et al., "*Client Puzzles: A Cryptographic Countermeasure Against Connection Depletion Attacks*", Proceedings of NDSS 1999, pp. 151-165.

Jakobsson, Markus et al., "*{Proofs of Work and Bread Pudding Protocols (Extended Abstracts)*" Proceedings of the IFIP TC6 and TC11 joint Working Conference on Communications and Multimedia Security, Sep. 1999.

* cited by examiner

ESTABLISHMENT OF A TRUSTED RELATIONSHIP BETWEEN UNKNOWN COMMUNICATION PARTIES

FIELD OF THE INVENTION

The present invention is directed to the field of cryptographic protocols and relates to an establishment of a trusted relationship between unknown communication parties. In particular, the present invention relates to means for establishing a trusted relationship between two mutually unknown communication parties in a communication system without the use of a trusted third party. The communication system is for example the Internet or an ad-hoc network.

BACKGROUND OF THE INVENTION

In recent years, communication technology has widely spread in terms of number of users and amount of use of the telecommunication services by the users. This also led to an enormous increase in the information and data amounts exchanged via the existing communication systems.

Thereby, for the users of communication systems there has arisen a remarkable problem of handling the huge information amounts they receive, in particular with respect to the handling of unsolicited or undesired information. Such spamming information (spamming: the use of any electronic communication medium to indiscriminately send unsolicited messages in bulk) may easily exceed the amount of desired "real" information by far. Such a situation not only makes it at least annoying and/or difficult for the users to filter out their desired "real" information but also easily leads to an overload of the capacity of information systems, such as for example the storage space of personal mailboxes.

Currently, the problem outlined above is prevalent in the Internet and especially in ad-hoc and/or sensor networks. However, it is not restricted to these kinds of networks but is particularly relevant to any communication system in which unknown (possibly unregistered) communication parties are present. From today's perception, this is notably the case in communication systems without a central party taking care of, for example, a centralized network and/or user management, security functions, or the like. As an example for such a system a distributed system environment such as in a peer-to-peer (P2P) system can be mentioned. Existing instances of this problem include:

e-mail, wherein an open e-mail infrastructure requires that anybody is able to send e-mail to anybody without prior mutual introduction;

WWW (world wide web) sites with persistent identities for their users that are managed by the WWW site itself; and network services provided by heavily resource constrained devices e.g. over wireless proximity networks, such as for example mobile devices.

For many of these scenarios or settings a unifying characteristic is that 'identities' of users can be generated at will (because of not being controlled by a central party) and are not managed by any central party.

When performed by a malicious party, such a situation of one party, e.g. a user (or user equipment) or network element, falsely claiming multiple identities has been called the "Sybil Attack" in literature. The "Sybil Attack" can thus be regarded as a kind of malicious identity fabrication and consequently undermines an assumed mapping between identity and entity in that the malicious party presents multiple (fabricated) identities to other parties.

The "Sybil Attack" has been discussed extensively in literature and was originally introduced in "The Sybil Attack" by John R. Douceur, Proceedings of the 1st International Workshop on Peer-to-Peer Systems (IPTPS02), Cambridge, Mass. (USA), March 2002.

A problem posed by the Sybil attack is compounded by the danger that a malicious party can gain control of a considerable and possibly even huge amount of networked computers on e.g. the Internet via worms, trojans and other malware. That is, a substantial fraction of the system can be controlled by the malicious party, thereby for example undermining the redundancy in the system which is actually indented to resist security threats. As such, already existing legitimate authorizations and identities can be compromised and placed under the control of a malicious party.

Such problems are underpinnings of the spam (i.e. unsolicited mass e-mailing) problem currently existing on the Internet.

A solution according to known prior art, for example being proposed in the above-mentioned paper of Douceur, is the insertion of a trusted third party into the system, which is arranged to certify identities. However, such a trusted third party would pose additional costs and efforts (concerning e.g. management or implementation) to the communication system.

Another approach to overcome or at least mitigate the above problems is referred to by the keyword "proof-of-work". Generally speaking, a proof-of-work system is a system used to prove that a device, such as a communication party, has done some "work", usually meaning it has spent some processing time and/or capacity. Thus, as concerns for example the prevention of spam, any computer that wants to send an e-mail has to produce such a proof-of-work before the receiver accepts the e-mail from this computer. The idea is that a party has to prove to be honest or "good-natured" by performing rather useless work, thereby hampering abuse or malpractice.

There exist some prior art in terms of proofs-of-work.

For example, the "penny black" project at Microsoft research presents papers related to proofs-of-work at http://research.microsoft.com/research/sv/PennyBlack.

The idea of proofs-of-work has been presented in the paper "Pricing via Processing or Combatting Junk Mail" by C. Dwork and M. Naor, *Lecture Notes in Computer Science*, 1993, pp. 137-147 (Proceedings of CRYPTO'92). Therein, also proofs-of-work based on signature schemes are used. In this paper the schemes however do not limit the applicability of the proof-of-work and also reveal it. Hence, they are not suitable for solving the above problem, i.e. for example for introducing new identities to each other.

Interactive proofs-of-work were introduced via the concept of client puzzles, originally designed to fight session object depletion attacks. These have been introduced in the paper "Client Puzzles: A Cryptographic Countermeasure Against Connection Depletion Attacks" by A. Juels and J. Brainard, in S. Kent, editor, *Proceedings of NDSS '99 (Networks and Distributed Security Systems)*, pages 151-165, 1999. These protocols can limit the applicability of the proof-of-work, but are interactive, and hence not applicable in e.g. store-and-forward networks. Additionally, it is not proposed or even suggested how such protocols could be used for solving the above problem, i.e. to introduce new identities to each other.

The idea of using proofs-of-work to do something "useful" instead of just wasting computational power has been introduced via the concept of "bread pudding protocols". This has been introduced in "Proofs of work and bread pudding protocols" by M. Jakobsson and A. Juels, in Proceedings of the IFIP TC6 and TC11 Joint Working Conference on Communications and Multimedia Security (CMS'99), Leuven, Belgium, September 1999.

None of the mentioned prior art approaches however provides for a solution suitable for the scenarios described above, in particular in connection with a Sybil Attack. Thus, the known prior art is not suited to solve the problems underlying the present invention in a practically acceptable manner.

Thus, a solution to the above problems and drawbacks is still needed for providing an improved introduction of two mutually unknown communication parties to each other in the absence of a trusted third party.

SUMMARY OF THE INVENTION

Consequently, it is an object of the present invention to remove the above drawbacks inherent to the prior art and to provide accordingly improved methods, communication devices, system, and computer program products.

According to a first aspect of the invention, this object is for example achieved by a method for establishing a trusted relationship between two mutually unknown communication parties in a communication system without use of a trusted third party, the method comprising:
  (i) performing the following steps at a first communication party of the two communication parties
  creating a set of data comprising at least identities of the two communication parties and information to be transferred from the first communication party to a second communication party;
  performing cryptographic computations based on the created set of data relating to an identity of the first communication party to derive a problem instance;
  solving the derived problem instance;
  generating a proof-of-work for the solving of the problem instance, wherein the proof-of-work is purpose-bound for establishing the trusted relationship; and
  transmitting the data and the proof-of-work to the second communication party, and thereupon
  (ii) performing the following steps at the second communication party
  verifying the proof-of-work for the solving of the problem instance; and
  generating and transmitting to the first communication party a session object for the trusted relationship, when the step of verifying yields an affirmative result.

According to a second aspect of the invention, this object is for example achieved by a method for initiating an establishment of a trusted relationship between two mutually unknown communication parties in a communication system without use of a trusted third party, the method being performed at a first communication party of the two communication parties and comprising the steps of:
  creating a set of data comprising at least identities of the two communication parties and information to be transferred from the first communication party to a second communication party;
  performing cryptographic computations based on the created set of data relating to an identity of the first communication party to derive a problem instance;
  solving the derived problem instance;
  generating a proof-of-work for the solving of the problem instance, wherein the proof-of-work is purpose-bound for establishing the trusted relationship; and
  transmitting the data and the proof-of-work to the second communication party.

According to a third aspect of the invention, this object is for example achieved by a method for completing an establishment of a trusted relationship between two mutually unknown communication parties in a communication system without use of a trusted third party, the method being performed at a second communication party of the two communication parties and comprising the steps of:
  verifying a proof-of-work for solving a problem instance which is received from a first communication party together with data comprising at least identities of the two communication parties and information to be transferred from the first communication party to the second communication party, wherein the proof-of-work is purpose-bound for establishing the trusted relationship; and
  generating and transmitting to the first communication party a session object for the trusted relationship, when the step of verifying yields an affirmative result.

According to further advantageous developments one or more of the following applies:
  the proof-of-work is a solution to the problem instance and the set of data contains a public key of the first communication party;
  the proof-of-work is a digital signature based on a proof-of-knowledge of a solution to the problem instance, wherein the proof-of-work does not reveal the problem instance solution and wherein the digital signature is computed over all or part of the set of data;
  the step of performing cryptographic computations comprises the step of performing a pseudo-random function on at least a part of the created set of data;
  the step of performing cryptographic computations further comprises the step of performing a mapping function for mapping a result of the pseudo-random function to a problem instance;
  the method further comprises a step of modifying at least a part of the set of data created and performing the cryptographic computations based on the modified set of data, when the step of solving fails;
  the step of verifying the proof-of-work comprises the steps of performing the cryptographic computations based on the set of data on which the cryptographic computations at the first communication party are based; and validating that the proof-of-work received corresponds to the performing of the cryptographic computations;
  the step of creating a set of data further comprises creating a timestamp in the set of data;
  the step of verifying the proof-of-work comprises a step of checking a timestamp to be valid;
  the session object contains a cryptographic key;
  the method further comprises a step of encrypting the generated session object prior to being transmitted; and/or
  the step of encrypting the session object is conducted on a basis of a public key of the first communication party which is contained in the set of data created.

According to a fourth aspect of the invention, this object is for example achieved by a communication device in a communication system configured to initiate an establishment of a trusted relationship between the communication device as a first communication party and a second communication party without the use of a trusted third party, wherein the two communication parties are mutually unknown, the communication device comprising:
  a creator configured to create a set of data comprising at least identities of the two communication parties and information to be transferred from the first communication party to the second communication party;

a performer configured to perform cryptographic computations based on the created set of data relating to an identity of the first communication party to derive a problem instance;

a solver configured to solve the derived problem instance;

a generator configured to generate a proof-of-work for the solving of the problem instance, wherein the proof-of-work is purpose-bound for establishing the trusted relationship; and a transceiver configured to transmit the data and the proof-of-work to the second communication party and to receive a session object from the second communication party.

According to a fifth aspect of the invention, this object is for example achieved by a communication device in a communication system configured to initiate an establishment of a trusted relationship between the communication device as a first communication party and a second communication party without the use of a trusted third party, wherein the two communication parties are mutually unknown, the communication device comprising:

means for creating a set of data comprising at least identities of the two communication parties and information to be transferred from the first communication party to the second communication party;

means for performing cryptographic computations based on the created set of data relating to an identity of the first communication party to derive a problem instance;

means for solving the derived problem instance;

means for generating a proof-of-work for the solving of the problem instance, wherein the proof-of-work is purpose-bound for establishing the trusted relationship; and means for transmitting the data and the proof-of-work to the second communication party and for receiving a session object from the second communication party.

According to further advantageous developments one or more of the following applies:

the performer is further configured to perform a pseudo-random function on at least a part of the set of data created by the creator;

the performer is further configured to perform a mapping function for mapping a result of the pseudo-random function to a problem instance;

the solver is further configured to cause the creator to modify at least a part of the set of data created and the performer to perform the cryptographic computations based on the modified set of data, when the solver fails to solve the problem instance;

the generator is further configured to generate the proof-of-work as a solution to the problem instance and the set of data contains a public key of the first communication party;

the generator is further configured to generate the proof-of-work as a digital signature based on a proof-of-knowledge of a solution to the problem instance, wherein the proof-of-work does not reveal the problem instance solution and wherein the digital signature is computed over all or part of the set of data; and/or the creator is further configured to create a timestamp in the set of data.

According to a sixth aspect of the invention, this object is for example achieved by a communication device in a communication system configured to complete an establishment of a trusted relationship between a first communication party and the communication device as a second communication party without use of a trusted third party, wherein the two communication parties are mutually unknown, the communication device comprising:

a transceiver configured to receive, from the first communication party, a proof-of-work for a solution to a problem instance together with data comprising at least identities of the two communication parties and information to be transferred from the first communication party to the second communication party, wherein the proof-of-work is purpose-bound for establishing the trusted relationship;

a verifier configured to verify the proof-of-work received; and a generator configured to generate a session object for the trusted relationship, when the verifier yields an affirmative result, and wherein the transceiver is further configured to transmit the session object generated by the generator to the first communication party.

According to a seventh aspect of the invention, this object is for example achieved by a communication device in a communication system configured to complete an establishment of a trusted relationship between a first communication party and the communication device as a second communication party without use of a trusted third party, wherein the two communication parties are mutually unknown, the communication device comprising:

means for receiving, from the first communication party, a proof-of-work for a solution to a problem instance together with data comprising at least identities of the two communication parties and information to be transferred from the first communication party to the second communication party, wherein the proof-of-work is purpose-bound for establishing the trusted relationship, means for verifying the proof-of-work received;

means for generating a session object for the trusted relationship, when the verifier yields an affirmative result; and means for transmitting the session object generated by the generator to the first communication party.

According to further advantageous developments one or more of the following applies:

the verifier is further configured to perform cryptographic computations based on a set of data on which the cryptographic computations at the first communication party are based; and validate that the proof-of-work received corresponds to the performing of the cryptographic computations;

the verifier is further configured to check a timestamp to be valid;

the generator is further configured to generate a session object containing a cryptographic key;

the generator is further configured to encrypt the generated session object prior to the transmission of the session object; and/or the generator is further configured to encrypt the session object on a basis of a public key of the first communication party.

According to an eighth aspect of the invention, this object is for example achieved by a system for establishing a trusted relationship between two mutually unknown communication parties in a communication system without use of a trusted third party, the system comprising:

(i) at least one first communication device according to any one of the fourth or fifth aspect of the present invention as a first communication party, and (ii) at least one second communication device according to any one of the sixth or seventh aspect of the present invention as the second communication party.

According to a ninth aspect of the invention, this object is for example achieved by a computer program product embodied on a computer readable medium and being loadable into a memory of a digital processing means of a communication device in a communication system and comprising software code portions for performing, when said product is run on said digital processing means, the steps according to any one of the first or second aspect of the present invention.

According to a tenth aspect of the invention, this object is for example achieved by a computer program product embodied on a computer readable medium and being loadable into a memory of a digital processing means of a communication device in a communication system and comprising software code portions for performing, when said product is run on said digital processing means, the steps according to any one of the first or third aspect of the present invention.

According to the embodiments of the present invention, there are two basic use cases for the proof-of-work. In a first use case, a proof-of-knowledge protocol is used, thus the proof-of-work having a property of being information-hiding. That is, the solution of the problem instance generated is not revealed by the proof-of-work, but only the problem instance solved. In a second use case, no proof-of-knowledge protocol is used, thus the proof-of-work not being information-hiding. That is, the proof-of-work also reveals the problem instance solution. However, even in this case, a trusted relationship between the communication parties can be established properly as the proof-of-work (though not being information-hiding) can not be used for another purpose due to its limited applicability defined by the data set created by the first communication party.

It is an advantage of the present invention that an introduction of two mutually unknown communication parties in the absence of a trusted third party is provided.

It is an advantage of the embodiments of the present invention that they provide for a non-interactive and/or information-hiding proof-of-work, i.e. a proof-of-work that does not reveal the proof as such, for the introduction of two mutually unknown communication parties.

It is a further advantage of the embodiments of the present invention that they present the use of a signature scheme based on a proof-of-work.

Advantageously, the embodiments of the present invention provide a feasible solution how to introduce an identity and associated data (including possibly a public key) via a proof that a certain amount of effort has been expended. Stated in other words, there is advantageously provided a solution how to cryptographically sign arbitrary information using a proof that some work was performed.

Further, all of the following advantages are achieved with the presented solution:
- the witness of a solved problem is not revealed and therefore an attacker gains no advantage by performing the proof-of-work as such;
- the presented protocol is non-interactive and it can be used with store-and-forward networks; and
- the witness is not revealed (see above) and can be used via a Fiat-Shamir heuristic to sign arbitrary data including a public key, therefore resulting in forward secrecy.

Finally, the computational arrangements associated with the present invention are (fully) parametrizable and therefore not too heavy and thus feasible.

BRIEF DESCRIPTION OF THE DRAWINGS

In the following, the present invention will be described in greater detail with reference to the accompanying drawings, in which.

DETAILED DESCRIPTION OF EMBODIMENTS OF THE PRESENT INVENTION

The present invention is described herein with reference to a particular non-limiting example. A person skilled in the art will appreciate that the invention is not limited to this example, and may be more broadly applied.

In particular, the present invention is generally directed to the field of cryptographic protocols and relates to an establishment of a trusted relationship between unknown communication parties in whatever environment with a respective architecture, such as for example the Internet and any ad-hoc or sensor network.

The description of the embodiments given herein refers to specific implementations of the basic general idea underlying the present invention, and the invention is thus not limited to any concrete example given.

In general terms, the present invention presents a generic framework for implementing a cryptographic protocol for the introduction of, i.e. the establishment of a trusted relationship between, two mutually unknown communication parties in the absence of a trusted third party.

Figure 1:
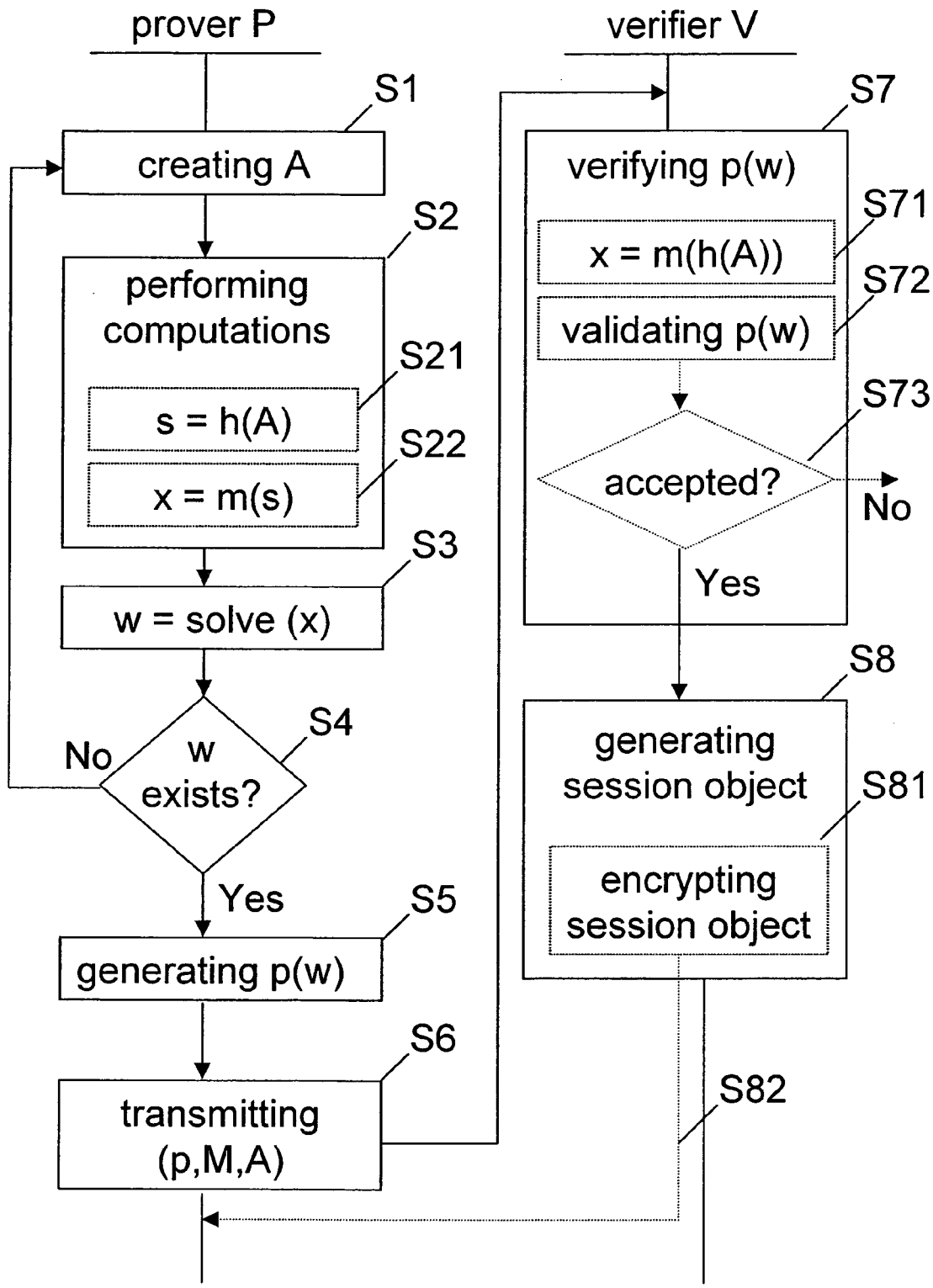
FIG. 1 shows a flow diagram of a generic protocol according to an embodiment of the present invention.

FIG. 1 shows a flow diagram of a generic protocol according to an embodiment of the present invention. The communication parties in the depicted protocol are denoted by prover P (i.e. a proving side) and verifier V (i.e. a verifying side). The generic protocol according to FIG. 1 is as follows.

The prover communication party P initiates the establishment of a trusted relationship with the verifier communication party V by creating a set A of data (step S1). The created set A of data contains for example an identifier for P, an identifier for V, and a salt $S\_1$ (i.e. an "initialization vector", a string of random bits used as an input to e.g. a key derivation function). The set A may also contain auxiliary data such as a public key or a cryptographic hash of a public key, a timestamp and/or a message to be sent to verifier V.

In a second step, step S2, the prover performs calculations which may be referred to as cryptographic computations. These are performed on the basis of the created data set A. In the context of the above-described concept of proof-of-work, these computations are basically the "work" to be done by the party that wants e.g. to send a message to another party.

According to the present embodiment, the computations of step S2 of FIG. 1 can exemplarily be subdivided into steps S21 to S22.

In step S21, the prover computes a bitstring s as a result of a pseudo-random function h being applied on the created data set A, i.e. $s=h(A)$. The pseudo-random function can for example be some kind of cryptographic hash function (e.g. SHA1). By applying a mapping function m for mapping an arbitrary bitstring to a problem instance, the prover P in step S22 creates/derives a computational problem x to be solved by himself, i.e. $x=m(s)$. The problem instance should on average be (sufficiently) hard to solve (e.g. require superpolynomial effort in the size of the problem). Let x=m(s) be a description of a "hard" problem instance computed by P.

In step S3, the prover P solves the problem instance x finding a solution w.

When the problem has no solution, i.e. no in step S4, then the prover P modifies at least a part of the originally created set A of data on which the computations are based, and for this goes back to step S1 and starts again the cryptographic computations of step S2 and the solving of step S3. For example, the salt S_1 in set A can be changed.

In case of yes in step S4, i.e. the problem instance x has a solution w, the protocol proceeds to step S5 in which the prover P generates a proof-of-work for the solving of the problem instance and thus also for the performing of the above-mentioned computations. This generated proof-of-work is limited in its applicability to an establishment of a trusted relationship between the communication parties involved.

In step S6, the prover P sends the proof-of-work p(w) and the input sets M and A to the second communication party, i.e. the verifier V.

For verifying the proof-of-work p(w) received from the prover P (step S7), the verifier V first performs a respective cryptographic computation m(h(A)) thus re-computing the problem instance x, step S71. In a next step S72, the verifier V validates that the proof-of-work p(w) corresponds to the knowledge of the solution w to the problem x derived from the set A.

In case the verifying of steps S71 and S72 does not yield an affirmative result, i.e. no in step S73, the verifier aborts the execution of the protocol, and thus no trusted relationship is established. In this case, messages sent from P to V are not considered to be sent from a trusted communication party. It is up to the local security policy (of verifier V) to decide what to do with these messages and how to proceed in this case. In case of yes in step S73, i.e. the introduction of prover P (a trusted relationship between P and V) is accepted due to the proof-of-work being correct, verifier V generates and transmits to the prover P any information required for communicating without the introduction protocol just carried out. Essentially, this information is herein represented by a so-called session object. This information or session object can also be encrypted using information contained in either set A or M and sent to P in an encrypted form. These steps are denoted by S8, S81, and S82 in FIG. 1, respectively.

The function w=solve(x) in step S3 must be significantly harder to compute than the validation function in steps S72 to S73. When this is not the case, the verifier V must spend approximately the same amount of work as P resulting in little gained trust.

The encrypting of the session object in step S82 can, according to embodiments of the present invention, be conducted in the following two ways:

i.) Either the problem instance x represents a public key that can be used to encrypt information, which then can also be decrypted with x (known both at the prover and the verifier). This however means that the information transmitted in step S82 can be decrypted by any adversary node that cares to solve the problem instance x (in any amount of time).

ii.) Alternatively, the information in set M or in set A contains a public key of prover P. In this case, verifier V can encrypt the information or session object using this public key, thereby binding the session object to this public key.

In the following, the two above-mentioned use cases of the embodiments of the present invention are described.

When the information in the set A is such that it limits the applicability of the proof-of-work to the prover P, then p(w) can be a function that outputs w (e.g. w=p(w)). This requires that the sets M and A equal each other. The binding of the usefulness of the proof-of-work to the prover P can be achieved by including a public-key corresponding to an identity of P in the set A. Thereby, no separate proof-of-knowledge protocol is necessary. In this case, the solution of the problem instance solved (i.e. the so-called witness) is revealed by the proof-of-work. Because of the limited applicability of the proof-of-work this however does not pose any problems to the performance of the proposed method.

In the alternative use case, a proof-of-knowledge protocol is used. In this case, the proof-of-work reveals the problem instance solved, as always, but does not reveal the corresponding solution of this problem instance (i.e. the witness). This is because the verifier V must (always) be aware of the problem instance in order to verify the proof-of-work, but in case of a proof-of-knowledge being used the verifier V does not need to know the solution thereof.

The proof-of-knowledge p(w) could also be understood as a signature over M using a key-pair derived from the set A, specifically with a public key of prover P defined by the set A. Using a proof-of-knowledge together with a pseudo-random challenge data created by a signer (i.e. the prover P) is called a Fiat-Shamir heuristic and has commonly been used to create public-key signature schemes.

The proof-of-knowledge protocol used is according to an embodiment of the present invention bound using the Fiat-Shamir heuristic to a set M of inputs. These inputs M can for example be a combination of any of the members in the data set A created in step S1. However, concrete cryptographic protocols may fail here when the randomness produced by the pseudo-random function of the proof-of-knowledge protocol is the same as the problem instance x of step S22 or the bitstring s of step S22. Therefore, a different salt S_2 may be included in the set M for avoiding such a malfunction.

As a further option, the verifier might require that the proof-of-work is sufficiently "fresh" (in terms of lifetime). Then, it verifies that either set M or set A contains a timestamp and checks that the timestamp to be valid, i.e. the value of the timestamp is not in the future and that it was made sufficiently recently (e.g. within the past 1 minute) and was made with the necessary granularity.

The method or protocol described above in rather detailed and exemplary manner can also be understood to essentially correspond to the following more generic steps:

prover P derives a computationally hard problem from some set identifying a session q between prover P and verifier V;

this problem is solved;

(optionally) another message bound to session q between prover P and verifier V is signed using a Fiat-Shamir Heuristic and a proof-of-knowledge; and verifier V responds with a concrete session object based on session q, which is sent to prover P.

At its core, the basic idea is to allow prover P to introduce a new session or identity (such as a public key) to verifier V using a proof-of-work in such manner that in future communication between prover P and verifier V this (or a similar) proof need not be redone, when the verifier V accepts it.

It is further to be noted that the problem instance x is obviously solvable as prover P can solve it himself (see steps S23 and S24 of FIG. 1), but it commits him to having solved a problem, i.e. to having done some "work". The system can be parameterized such that this "work" constitutes a sufficient amount of effort to be depending on how much effort is required for an 'introduction' of two unknown parties to each other. The amount of pre-computation that can be performed by prover P or an adversary node depends on what elements are required to be contained in the data set A.

Figure 2:
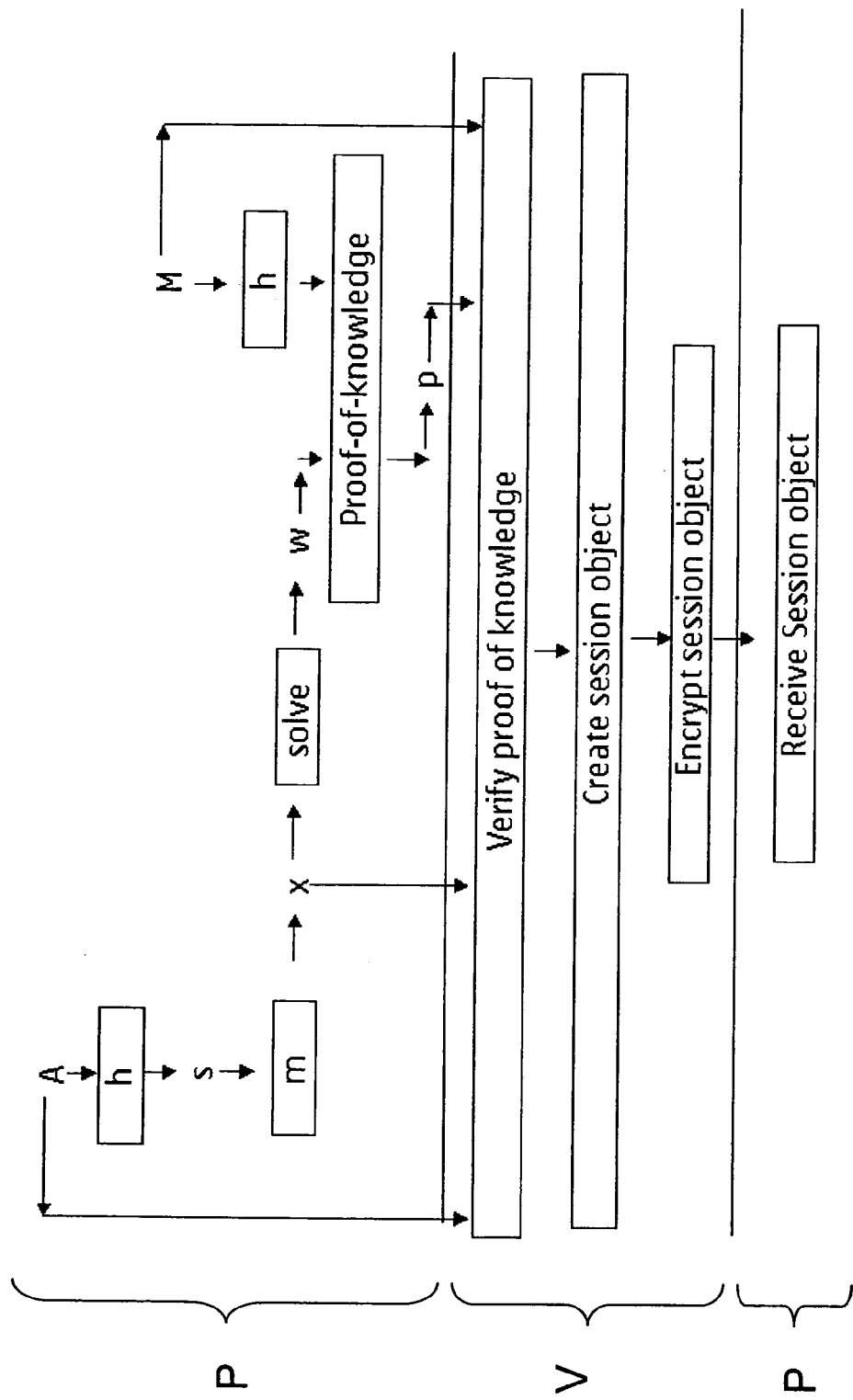
FIG. 2 shows another illustrative representation of a generic protocol according to an embodiment of the present invention.

FIG. 2 shows another illustrative representation of a generic protocol according to an embodiment of the present invention. In FIG. 2, the progress of the method or protocol of this embodiment is indicated by arrows, starting from the creation of a data set A and ending with the reception of a session object at prover P. In this connection, it is to be noted that the processing conducted at the different participating communication parties is arranged vertically, separated by horizontal solid lines. This is also indicated by the accolades pointing at the respective letters P and V denoting the prover and the verifier, respectively.

Figure 3:
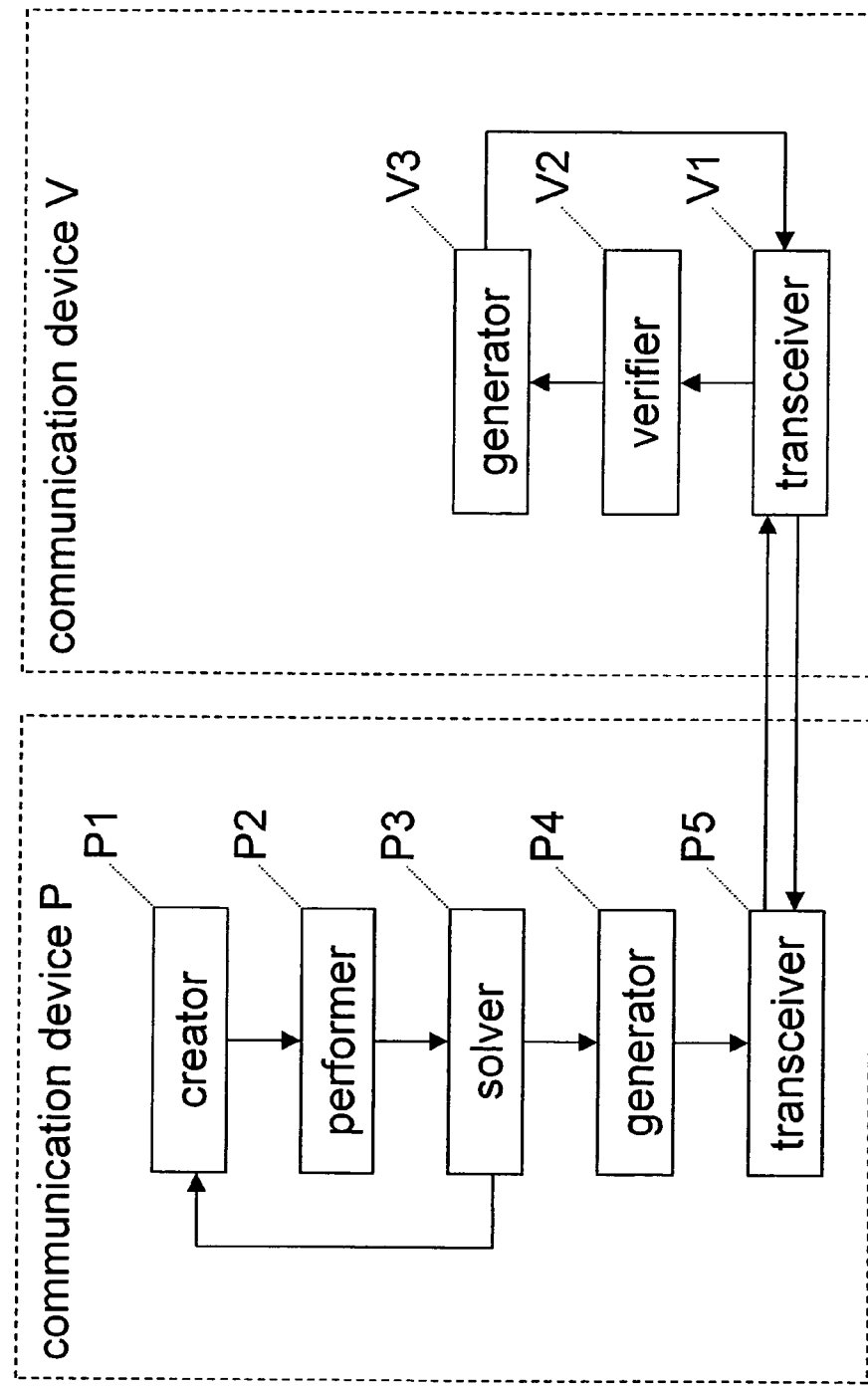
FIG. 3 shows a block diagram of two communication devices according to an embodiment of the present invention.

Further, like references and denotations in FIGS. 1 and 3 designate like parameters, operations and information, respectively. Thus, it can be gathered that FIG. 2 is another representation as compared with that of FIG. 1, i.e. rather in logical terms than in terms of timely progress, but illustrates a quite similar method or protocol. Accordingly, a detailed description of FIG. 2 is omitted and reference is made to the description of FIG. 1.

In summary and stated in more general terms, the present invention provides for a method for establishing a trusted relationship between two mutually unknown communication parties in a communication system without use of a trusted third party, the method comprising:
(i) performing the following steps at a first communication party of the two communication parties creating a set of data comprising at least identities of the two communication parties and information to be transferred from the first communication party to a second communication party;
performing cryptographic computations based on the created set of data relating to an identity of the first communication party to derive a problem instance;
solving the derived problem instance;
generating a proof-of-work for the solving of the problem instance, wherein the proof-of-work is purpose-bound for establishing the trusted relationship; and
transmitting the data and the proof-of-work to the second communication party, and thereupon
(ii) performing the following steps at the second communication party
verifying the proof-of-work for the solving of the problem instance; and
generating and transmitting to the first communication party a session object for the trusted relationship, when the step of verifying yields an affirmative result.

As already stated above, there are two basic use cases for the proof-of-work. In a first use case, a proof-of-knowledge protocol is used, thus the proof-of-work having a property of being information-hiding. That is, the solution of the problem instance generated is not revealed by the proof-of-work, but only the problem instance solved. In a second use case, no proof-of-knowledge protocol is used, thus the proof-of-work not being information-hiding. That is, the proof-of-work also reveals the problem instance solution. However, even in this case, a trusted relationship between the communication parties (i.e. prover and verifier) can be established properly as the proof-of-work (though not being information-hiding) can not be used for another purpose due to its limited applicability defined by the data set created by the first communication party (i.e. the prover). In short, either a proof-of-knowledge protocol is used (and the solution of the problem instance is not revealed) or a public key of the prover must be present in the data set A.

That is, there is provided a method comprising respective method steps performed at the first and second communication parties, i.e. for example steps S1 through S82 of FIG. 1.

According to another aspect of the present invention, there is provided a method comprising respective method steps performed at the first communication party P, i.e. for example steps S1 through S6 of FIG. 1.

According to another embodiment of the present invention, there is also provided a method comprising respective method steps performed at the second communication party V, i.e. for example steps S7 through S82 of FIG. 1.

According to the basic idea of the present invention, the generated proof-of-work is bound in applicability to introducing two communication parties P and V to each other. The proof-of-work may directly be a solution to the said problem instance or a digital signature based on a proof-of-knowledge of the solution used with the Fiat-Shamir heuristic over a set of data introducing prover P to verifier V.

The following section describes—only in short—an implementation of the protocol according to an embodiment of the present invention as a first detailed example for embodying the same. The below implementation example is based upon a proof-of-knowledge based on knowledge of discrete logarithms and a public key cryptosystem. The communication parties are again denoted by P (prover) and V (verifier).

The global parameters and operations used are defined as follows:
let $q=2p+1$ be integers such that q, p are both prime;
let g be a generator modulo q of a cyclic multiplicative group such that $|<g>|=p$. The group operation is multiplication modulo q. g should be a quadratic residue mod q;
let $h(k, m)$ be an HMAC function (HMAC: keyed hashing for message authentication) based on secure hash algorithm 1 (SHA1);
let id_P and id_V be bitstrings representing the identities of prover P and verifier V;
let $\|$ denote the concatenation operator of strings (including bitstrings); and
let K_P be a public key of P in any cryptosystem.

The thus implemented protocol is as follows:
1. P randomly chooses a bitstring s_1.
2. Let aux be a bitstring representing any (auxiliary) information required e.g. to bootstrap a session or to be transmitted from P to V.
   a. When this information (or message) is piggy-backed on top of an existing message m then aux must contain a representation of that message m.
   b. The bitstring aux should contain a timestamp, when it is required that proofs-of-work are "fresh".
   That is, created data set A={id_P, id_V, K_P s_1, aux}.
3. P computes $x=h(s\_1, id\_P \| id\_V \| aux)$.
4. P solves the discrete logarithm of x with base g resulting in w such that $g^w=x \mod q$. When no such w exists then go back to step 1 and choose another s_1.
5. P chooses randomly bitstrings s_2 and s_3.
6. P computes $r=h(s\_2, id\_P \| id\_V \| K\_P \| aux)$.
7. P computes $G=g^{s\_3} \mod q$.
8. P computes $c=s\_3+r w$.
9. P sends G, s_1, s_2, c, id_P, id_V, K_P and aux to V.
10. V computes $r=h(s\_2, id\_P \| id\_V \| K\_p \| aux)$.
11. V computes $x=h(s\_1, id\_P \| id\_V \| aux)$.
12. V checks whether $g^c=G \cdot x^r$. If so, then V accepts the proof-of-knowledge. If not, then V aborts the protocol and no introduction of the two parties to each other is effected.

13. When aux contained a timestamp, then V checks that the timestamp is valid, i.e. has the correct granularity and is sufficiently recent and is not in the future.
14. V creates a session object, possibly one containing a cryptographic key, and encrypts it using K_P and sends it back to P.

Accordingly, the thus implemented protocol is based on the Schnorr identification, i.e. the standard proof-of-knowledge of a discrete logarithm.

The following section describes—only in short—an implementation of the protocol according to an embodiment of the present invention as a second detailed example for embodying the same. The below implementation example is based upon binding the set A to the prover P using knowledge of a pre-image of a cryptographic hash function. That is, a proof-of-knowledge protocol is not required and the sets A and M equal each other.

The global parameters and operations used are defined as follows:
  let h(k) be a hash function, e.g. a SHA1-function;
  let msb(n, x) represent the n most significant bits of x;
  let id_P and id_V be bitstrings representing the identities of prover P and verifier V;
  let || denote the concatenation operator of strings (including bitstrings);
  let K_P be a public key of P in any cryptosystem; and
  let n be an integer between 1 and 160.

The thus implemented protocol is as follows:
1'. Let aux be a bitstring representing any (auxiliary) information required e.g. to bootstrap a session or to be transmitted from P to V.
  a. When this information (or message) is piggy-backed on top of an existing message m then aux must contain a representation of that message m.
  b. The bitstring aux should contain a timestamp, when it is required that proofs-of-work are "fresh".
That is, created data set A={id_P, id_V, K_P, aux}.
2'. Let x=id_P || id_V || K_P || aux.
3'. Compute w such that msb(n, x)=msb(n, h(w)).
4'. P sends A={id_P, id_V, K_P and aux} and w to V.
5'. V computes x'=id_P || id_V || K_P || aux as defined by the received A.
6'. V checks that msb(n, x')=msb(n, h(w)).
7'. When aux contained a timestamp, then V checks that the timestamp is valid, i.e. has the correct granularity and is sufficiently recent and is not in the future.
8'. V creates a session object, possibly one containing a cryptographic key, and encrypts it using K_P and sends it back to P.

FIG. 3 shows a block diagram of two communication devices according to another embodiment of the present invention. Thereby, also an embodiment of a system according to the present invention is shown although such a system can as well comprise more than two such communication devices. The arrows in FIG. 3 illustrate both the physical and/or logical connections between the individual blocks and the flow of operation.

According to the present embodiment, a first communication device denoted by P corresponds to the prover of FIGS. 1 and 2, and a second communication device denoted by V corresponds to the verifier of FIGS. 1 and 2.

The communication device P wants to initiate an establishment of a trusted relationship between itself and the second communication device V, i.e. to introduce itself at V, without the use of a trusted third party. The device P according to the present embodiment comprises a creator P1, a performer P2, a solver P3, a generator P4, and a transceiver P5.

The creator P1 is embodied to create a set A of data (cf. step S1 of FIG. 1) and to pass this set to the performer P2. The performer P2 then performs cryptographic computations based on this set of data relating to the identity of the prover P to derive a problem instance. To this end, the performer P2 can be configured to perform one or more of the following operations:
  performing a pseudo-random function on at least a part of the set of data created by the creator (see step S21 of FIG. 1); and
  performing a mapping function for mapping a result of the pseudo-random function to a problem instance (see step S22 of FIG. 1).

According to further embodiments of the present invention, the performer P2 can also include distinct means for performing one or more of the above operations, for example a mapper for the mapping operation.

The performer P2 supplies the problem instance derived to the solver P3 which is configured to solve this problem instance (see step S3 of FIG. 1). Upon the solution of the problem instance computed at the solver P3, the generator P4 of device P generates a proof-of-work for the solving of the problem instance (see step S5 of FIG. 1). In case no solution is available to the problem instance derived (i.e. NO in step S5 of FIG. 1), the solver P3 is configured to e.g. cause the creator P1 to modify at least a part of the set of data created and to restart the respective operations based on the modified set of data. In FIG. 2, this is indicated by means of an arrow from solver P3 back to creator P1.

The transceiver P5 of device P then transmits the proof-of-work and associated information (i.e. the data) to the second communication device V.

The communication device V has to complete the establishment of a trusted relationship initiated by the device P and thus acts as the second communication party. The device V according to the present embodiment comprises a transceiver V1, a verifier V2, and a generator V3.

The transceiver V1 first receives the signed information and the proof-of-work for performing cryptographic computations from the first device P, and passes this data on the verifier V2. The verifier V2 is to verify the proof-of-work received from the transceiver V1 (cf. step S7 of FIG. 1). To this end, the verifier V2 can be configured to perform one or more of the following operations:
  performing the cryptographic computations based on the set of data on which the cryptographic computations at the first communication party are based; and
  validating that the proof-of-work received corresponds to the performing of the cryptographic computations; and
  checking a timestamp to be valid.

According to further embodiments of the present invention, the verifier can also include distinct means for performing one or more of the above operations (comparable to steps S71 and S72 of FIG. 1), for example a checker for checking a timestamp.

The generator V3 then generates required information such as a session object for a trusted relationship, when the verifier yields an affirmative result. In this case, the generator V3 passes the generated session key on to the transceiver V1 for transmitting it to the first communication party P, whereupon the transceiver P4 of device P receives it.

The generator can also be configured to perform or include distinct means for
  generating a session object containing a cryptographic key;
  encrypting the generated session object prior to a transmission of the session object; and/or encrypting the session object on the basis of a public key of the first communication party.

Either one of the two communication devices P and V of FIG. 3 can for example be a network element or a terminal equipment, whether mobile or non-mobile.

The communication devices illustrated in FIG. 3 (and thus the system comprised thereof) are thus configured for use in a method for establishing a trusted relationship as defined in the appended claims.

In general, it is to be noted that the mentioned functional elements, e.g. the signer or the verifier according to the present invention can be implemented by any known means, either in hardware and/or software, respectively, when it is only adapted to perform the described functions of the respective parts. For example, the verifier of the device V can be implemented by any data processing unit, e.g. a microprocessor, being configured to verify the received proof-of-work accordingly as defined by the appended claims. The mentioned parts can also be realized in individual functional blocks or by individual devices, or one or more of the mentioned parts can be realized in a single functional block or by a single device. Correspondingly, the above illustration of FIG. 3 is only for illustrative purposes and does not restrict an implementation of the present invention in any way.

Furthermore, method steps likely to be implemented as software code portions and being run using a processor at one of the peer entities are software code independent and can be specified using any known or future developed programming language such as e.g. C, C++, and Assembler. Method steps and/or devices or means likely to be implemented as hardware components at one of the peer entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

The proposed protocol and arrangements are not designed for the case where identities are authenticated or the session object would be used to guarantee confidentiality or providing full authenticity in the face of active man-in-the-middle attacks, although the proposed protocol and arrangements are suitable for at least slowing down such attacks. Rather, the idea of the present invention is applicable for introducing two parties such that a session may be set up between those. Thus, the present invention is applicable as well as useful as (at least) a component in a system for solving fundamental security problems in e.g. ad-hoc and overlay networks or reputation systems. The present invention can for example be applied to message filtering systems (such as e-mail or instant messaging) or to the imprinting problem in ad-hoc networks. Further application examples are fighting spam and access-control for browsing, as well as bootstrapping a (low-level) of trust for an authorization scheme. In addition, the present invention is suitable for at least slowing down and thus combating man-in-the-middle attacks at least to some extent, if not preventing them at all.

In summary, the present invention presents a possibility how to create a protocol for introducing two unknown communication parties to each other using a proof-of-work in such a manner that the proof-of-work cannot be reused or used for anything else and that further communications can be based on this (one-time) introduction with no further proofs-of-work being required. Namely, the present invention proposes an ability to bind a proof-of-work in such a manner that "nobody" can reuse it e.g. for another purpose, i.e. it is essentially limited in applicability to a defined purpose such as introducing a public key or session object to another party. Thereby, it is also allowed that "anybody" (e.g. a communication party trying to establish a session with another communication party) can sign "anything" (i.e. some set of data) using the solution defined by the proof-of-work by applying a proof-of-knowledge protocol together with the Fiat-Shamir heuristic.

Stated in other words, the present invention provides an establishment of a trusted relationship between two mutually unknown communication parties in a communication system without the use of a trusted third party. The invention is based on non-interactive proofs-of-work being purpose-bound for establishing the trusted relationship and cryptographically signing information to be transferred between the communication parties using such proofs-of-work for the solving of a problem instance along with verifying the proofs-of-work and generating a session object for a trusted relationship, when the verifying yields an affirmative result.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

The invention claimed is:

1. A method comprising:
(i) performing the following at a first communication party of two communication parties between which a trusted relationship is to be established,
creating a set of data comprising at least identities of the two communication parties and identifying a session between the two communicating parties;
performing a first set of cryptographic computations based on the created set of data relating to an identity of the first communication party to derive a first problem instance;
solving the first problem instance, where solving the first problem instance requires at least superpolynomial effort;
generating a proof-of-work for the solving of the first problem instance, wherein the proof-of-work is purpose-bound for establishing the trusted relationship; and
transmitting the set of data and the proof-of-work to the second communication party, and thereupon
(ii) performing the following at the second communication party,
receiving the set of data and the proof-of-work from the first communication party;
performing a second set of cryptographic computations based on the received set of data to derive a second problem instance,
where the first problem instance is identical to the second problem instance;
verifying the proof-of-work for the solving of the second problem instance; and
generating and transmitting to the first communication party a session object for the trusted relationship based on the session identified in the set of data, when the verifying yields an affirmative result, where the session object comprises information for communicating between the two communication parties without an introduction protocol.

2. A method comprising:
receiving a set of data and a proof-of-work from a first communication party, where the set of data comprises at least identities of two communication parties between which a trusted relationship is to be established and identifying a session between the two communicating parties;
performing a set of cryptographic computations based on the received set of data to derive a problem instance,
where the problem instance is identical to another problem instance used by the first communication party to generate the proof-of-work and where solving the problem instance requires at least superpolynomial effort;
verifying the proof-of-work for solving the problem instance, wherein the proof-of-work is purpose-bound for establishing the trusted relationship; and
generating and transmitting to the first communication party a session object for the trusted relationship based on the session identified in the set of data, when the verifying yields an affirmative result,
where the session object comprises information for communicating between the two communication parties without an introduction protocol,
wherein the performing of the set of cryptographic computations comprises performing a pseudo-random function on at least a part of the received set of data, and
wherein the verifying the proof-of-work comprises:
performing the set of cryptographic computations based on the set of data on which the set of cryptographic computations at the first communication party are based; and
validating that the proof-of-work received corresponds to the performing of the set of cryptographic computations.

3. The method according to claim 1, wherein the proof-of-work is a solution to the first problem instance and the set of data contains a public key of the first communication party.

4. The method according to claim 1, wherein the proof-of-work is a digital signature based on a proof-of-knowledge of a solution to the first problem instance, wherein the proof-of-work does not reveal the solution to the first problem instance and wherein the digital signature is computed over all or part of the set of data.

5. The method according to claim 2, wherein the performing of the set of cryptographic computations further comprises:
performing a mapping function for mapping a result of the pseudo-random function to a problem instance.

6. The method according to claim 1, further comprising:
modifying at least a part of the set of data created and performing the set of cryptographic computations based on the modified set of data, when the solving fails.

7. The method according to claim 1, wherein the creating the set of data further comprises creating a timestamp in the set of data.

8. The method according to claim 1, wherein the verifying the proof-of-work comprises checking a timestamp to be valid.

9. The method according to claim 1, wherein the session object contains a cryptographic key.

10. The method according to claim 1, further comprising encrypting the session object prior to being transmitted.

11. The method according to claim 10, wherein the encrypting the session object is conducted on a basis of a public key of the first communication party which is contained in the set of data created.

12. An apparatus comprising at least one processor; and at least one memory including computer program code, the at least one memory and the computer program code configured to, with the at least one processor, cause the apparatus to perform at least the following:
to receive, from a first communication party, a proof-of-work for a solution to a problem instance together with a set of data comprising at least identities of two communication parties between which a trusted relationship is to be established and identifying a session between the two communicating parties, wherein the proof-of-work is purpose-bound to establish the trusted relationship;
to perform a set of cryptographic computations based on the received set of data to derive a problem instance,
where the problem instance is identical to another problem instance used by the first communication party to generate the proof-of-work and where solving the problem instance requires at least superpolynomial effort;
to verify the proof-of-work received for solving the problem instance;
to generate a session object for the trusted relationship based on the session identified in the set of data, when the verifier yields an affirmative result; and
to transmit the session object generated to the first communication party,
where the session object comprises information for communicating between the two communication parties without an introduction protocol,
wherein the performing of the set of cryptographic computations comprises performing a pseudo-random function on at least a part of the received set of data, and
wherein the at least one memory and the computer program code are further configured to cause the apparatus:
to perform the set of cryptographic computations based on the set of data on which the set of cryptographic computations at the first communication party are based; and
to validate that the proof-of-work received corresponds to the performance of the set of cryptographic computations.

13. An apparatus comprising:
means for receiving, from a first communication party, a proof-of-work for a solution to a problem instance together with a set of data comprising at least identities of two communication parties between which a trusted relationship is to be established and identifying a session between the two communicating parties, wherein the proof-of-work is purpose-bound for establishing the trusted relationship,
means for performing a set of cryptographic computations based on the received set of data to derive a problem instance,
where the problem instance is identical to another problem instance used by the first communication party to generate the proof-of-work and where solving the problem instance requires at least superpolynomial effort;
means for verifying the proof-of-work received for solving the problem instance;
means for generating a session object for the trusted relationship based on the session identified in the set of data, when the verifier yields an affirmative result; and
means for transmitting the session object generated by the generator to the first communication party,
where the session object comprises information for communicating between the two communication parties without an introduction protocol, wherein the performing means comprises means for performing a pseudo-random function on at least a part of the received set of data, and wherein the verifying means comprises:

means for performing the set of cryptographic computations based on the set of data on which the set of cryptographic computations at the first communication party are based; and means for validating that the proof-of-work received corresponds to the performing of the set of cryptographic computations.

14. The apparatus according to claim 12, wherein the at least one memory and the computer program code are further configured to cause the apparatus to check a timestamp to be valid.

15. The apparatus according to claim 12, wherein the at least one memory and the computer program code are further configured to cause the apparatus to generate a session object containing a cryptographic key.

16. The apparatus according to claim 12, wherein the at least one memory and the computer program code are further configured to cause the apparatus to encrypt the session object prior to the transmission of the session object.

17. The apparatus according to claim 16, wherein the at least one memory and the computer program code are further configured to cause the apparatus to encrypt the session object on a basis of a public key of the first communication party.

18. A non-transitory computer readable medium tangibly encoded with a computer program executable by a processor to perform the actions comprising:

receiving a set of data and a proof-of-work from a first communication party, where the set of data comprises at least identities of two communication parties between which a trusted relationship is to be established and identifying a session between the two communicating parties;

performing a set of cryptographic computations based on the received set of data to derive a problem instance, where the problem instance is identical to another problem instance used by the first communication party to generate the proof-of-work and where solving the problem instance requires at least superpolynomial effort;

verifying the proof-of-work for a solution to the problem instance, wherein the proof-of-work is purpose-bound for establishing a trusted relationship; and generating and transmitting to the first communication party a session object for the trusted relationship based on the session identified in the set of data, when the verifying yields an affirmative result, where the session object comprises information for communicating between the two communication parties without an introduction protocol, wherein the performing of the set of cryptographic computations comprises performing a pseudo-random function on at least a part of the received set of data, and wherein the verifying the proof-of-work comprises:

performing the set of cryptographic computations based on the set of data on which the set of cryptographic computations at the first communication party are based; and validating that the proof-of-work received corresponds to the performing of the set of cryptographic computations.

19. The method according to claim 2, wherein the proof-of-work is a solution to the problem instance and the set of data contains a public key of the first communication party.

20. The method according to claim 2, wherein the proof-of-work is a digital signature based on a proof-of-knowledge of a solution to the problem instance, wherein the proof-of-work does not reveal the solution to the problem instance and wherein the digital signature is computed over all or part of the set of data.

21. The method according to claim 1, where the pseudo-random function is a hash function.

22. The method according to claim 1, where the first set of cryptographic computation are identical to the second set of cryptographic computation.

* * * * *